United States Patent [19]

Matsumoto

[11] Patent Number: 5,165,096
[45] Date of Patent: Nov. 17, 1992

[54] IMAGE COMMUNICATION APPARATUS HAVING COMMUNICATION WITH ANOTHER COMMUNICATION APPARATUS AND A SHARED COMMUNICATION LINE

[75] Inventor: Kouichi Matsumoto, Tokyo, Japan

[73] Assignee: Canon Kabushiki Kaisha, Tokyo, Japan

[21] Appl. No.: 630,856

[22] Filed: Dec. 20, 1990

[30] Foreign Application Priority Data

Dec. 22, 1989 [JP] Japan ................. 1-331354

[51] Int. Cl.⁵ .......................................... H04M 11/00
[52] U.S. Cl. ..................................... 379/97; 379/100; 358/438
[58] Field of Search ............. 379/100, 96–98, 379/67, 88, 102, 105; 358/400, 434, 438

[56] References Cited

U.S. PATENT DOCUMENTS

| | | | |
|---|---|---|---|
| 4,584,434 | 4/1986 | Hashimoto | 379/100 |
| 4,677,660 | 6/1987 | Yoshida | 379/100 |
| 4,773,080 | 9/1988 | Nakajima et al. | 379/100 |
| 4,800,439 | 1/1989 | Yoshino | 379/100 |
| 4,815,121 | 3/1989 | Yoshida | 379/100 |
| 4,825,461 | 4/1989 | Kurita et al. | 379/100 |
| 4,868,865 | 9/1989 | Ogawa et al. | 379/100 |
| 4,932,048 | 6/1990 | Kenmochi et al. | 379/100 |
| 4,974,253 | 11/1990 | Hashimoto | 379/100 |

FOREIGN PATENT DOCUMENTS

| | | | |
|---|---|---|---|
| 62-281655 | 12/1987 | Japan | 379/100 |
| 63-148750 | 6/1988 | Japan | 379/100 |
| 2-186759 | 7/1990 | Japan | 379/100 |
| 2183427 | 6/1987 | United Kingdom | 379/105 |
| 2213681 | 8/1989 | United Kingdom | 379/100 |

*Primary Examiner*—James L. Dwyer
*Assistant Examiner*—Wing F. Chan
*Attorney, Agent, or Firm*—Fitzpatrick, Cella, Harper & Scinto

[57] ABSTRACT

An image communication apparatus comprises a selector for selecting a first receive mode or a second receive mode, a first detector for detecting a protocol signal of image communication, a second detector for detecting a DTMF signal, and a control unit for effecting the image communication in accordance with the selection by the selector and the detections by the first and second detectors.

8 Claims, 3 Drawing Sheets

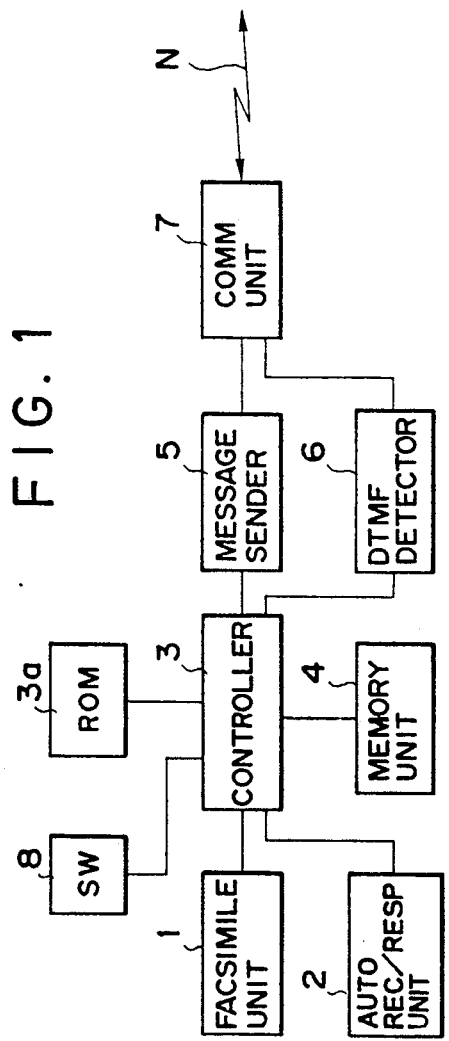
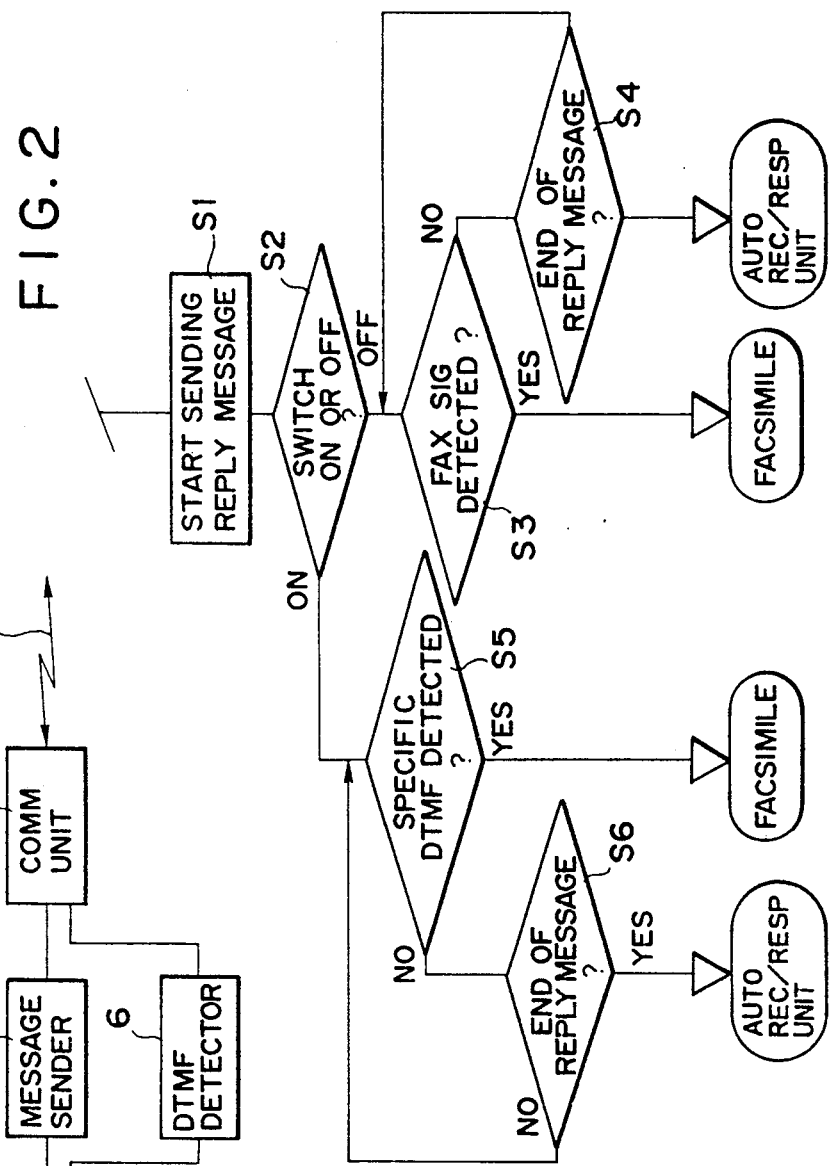

IMAGE COMMUNICATION APPARATUS HAVING COMMUNICATION WITH ANOTHER COMMUNICATION APPARATUS AND A SHARED COMMUNICATION LINE

BACKGROUND OF THE INVENTION

1. Field of the Invention

The present invention relates to an image communication apparatus, and more particularly to an image communication apparatus having a DTMF (Dual Tone Multi-Frequency) signal receiving function.

2. Related Background Art

A facsimile device for communicating data through a telephone line which has a speech communication function, particularly an automatic recording function, has been known.

In a prior art device of this type, the facsimile device has the automatic recording function of telephone built in but the respective functions are independent.

In the prior art facsimile device having the automatic recording function, it is usual that the automatic recording function and the facsimile communication function are independently provided and one of the modes is selected by a switch.

When the automatic recording mode is set in such a device, the facsimile communication is not attained, and when the facsimile mode is set, only the facsimile communication can be effected.

In this regard, a device which detects a signal inherent to the facsimile when the signal is received and selects either the automatic recording mode or the facsimile mode in accordance with the received signal has been proposed, but this device still has the following problems.

1) It cannot avoid the reception of a direct mail and hence a recording sheet is wasted.

2) The facsimile communication in a closed specification (communication to limited persons in a closed area) is not attained.

The switching between the telephone mode and the facsimile mode is disclosed in the U.S. Pat. Nos. 4,773,080; 4,677,660; 4,815,121; 4,800,439 and 4,932,048.

SUMMARY OF THE INVENTION

It is an object of the present invention to improve an image communication apparatus in the light of the above problems.

It is another object of the present invention to provide an image communication apparatus which shifts from a speech communication mode to an image communication mode upon reception of a specific DTMF signal.

It is a still another object of the present invention to provide an image communication apparatus which can select an image communication response mode and a speech communication response mode to the received signal, and shifts to the image communication response mode when the specific DTMF signal is received in the speech communication response mode.

It is still another object of the present invention to provide an image communication system which selectively uses one line for at least two image communication apparatus and enables the image communication between the two image communication apparatus when a predetermined operation is done in a stand-by mode and the specific DTMF signal is received.

Other objects of the present invention will be apparent from the following detailed description of the embodiments and the accompanying drawings.

BRIEF DESCRIPTION OF THE DRAWINGS

FIG. 1 shows a block diagram of a facsimile device in accordance with one embodiment of the present invention, FIG. 2 shows a flow chart of a control operation of a control unit 3.

DETAILED DESCRIPTION OF THE PREFERRED EMBODIMENTS

Figure 3:
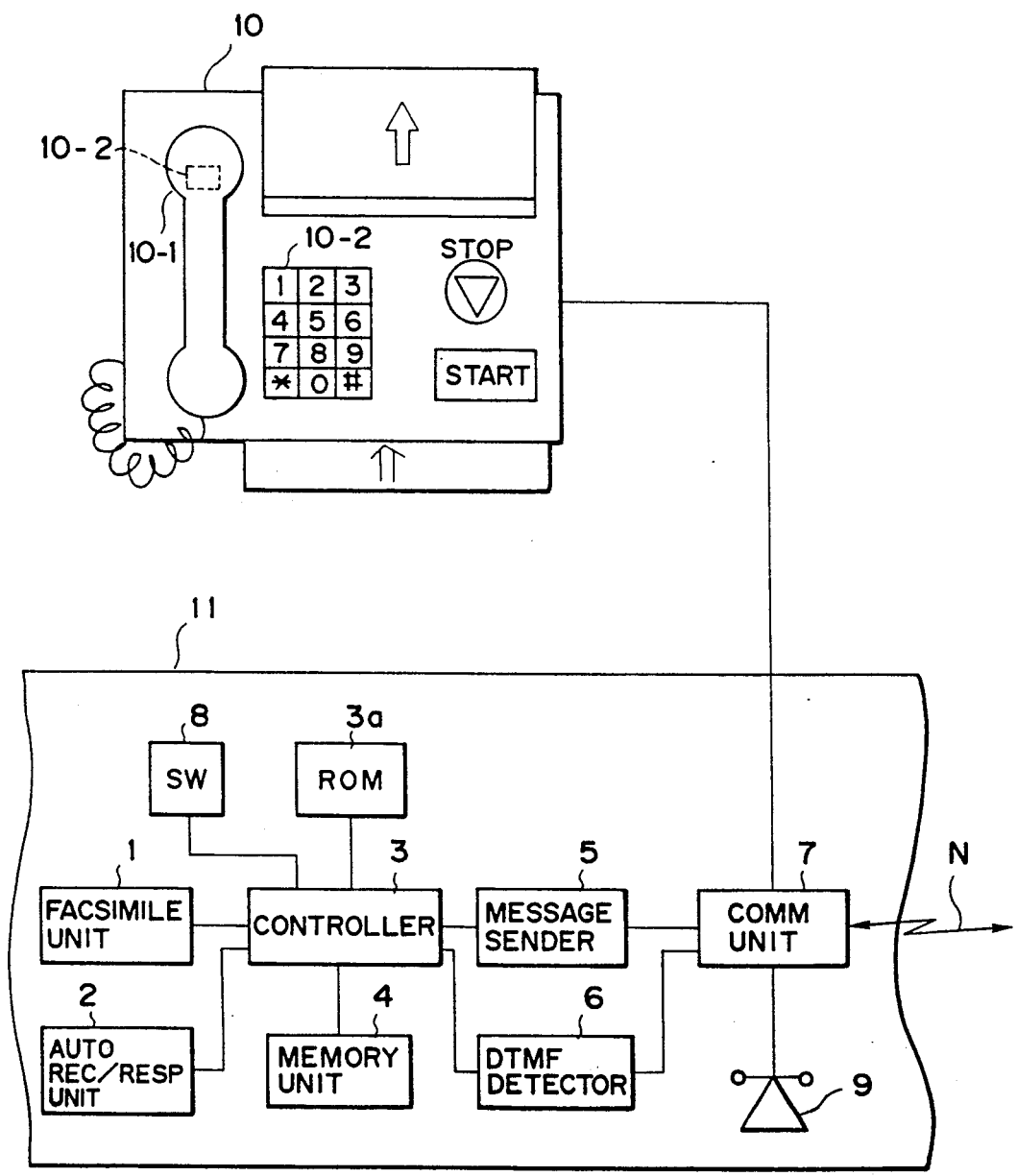
FIG. 3 shows a block diagram of a communication system in accordance with a second embodiment.

Embodiments of the present invention are explained in detail with reference to the drawings.

In a first embodiment, a facsimile response mode to a call received from a line and an automatic recording/responding mode (speech communication mode) are selectively used, and the device shifts to the facsimile response mode when it receives a specific DTMF signal in the speech communication mode.

FIG. 1 shows a block diagram of a facsimile device of the first embodiment.

Numeral 3 denotes a control unit such as a microprocessor which controls the entire device in accordance with a control program, to be described later, stored in a ROM 3a. The following elements are connected to the control unit 3.

Numeral 1 denotes a facsimile unit which comprises a known image input/output unit (image reader and recorder), and numeral 2 denotes an automatic recording/responding unit such as a tape recorder, which is used to record a speech message from a sending station.

Numeral 4 denotes a memory such as a ROM or a RAM which stores a pattern of a specific DTMF signal to be detected in a receiving protocol to be described later. The DTMF pattern is set prior to the receiving control to be described later.

Numeral 5 denotes a response message sending unit which is used to send a speech response message recorded in a semiconductor memory or tape.

Numeral 7 denotes a communication unit which comprises a modem and an NCU and receives and sends an analog-modulated image signal and a protocol signal from and to a line N.

Numeral 6 denotes a DTMF detector which detects the DTMF signal and supplies digital data representing the received DTMF signal through the communication unit 7 to the control unit 3.

Numeral 8 denotes a switch arranged on a console panel (not shown). The position of the switch is used in the control to be described later.

An operation of the above configuration is explained with reference to FIG. 2, which shows a control program of the control unit 3 stored in a ROM 3a of FIG. 1. A receiving control protocol in the automatic selection mode for the facsimile communication mode and the automatic recording/responding mode, which is set when no attendant is at the site of the device is explained below.

When a call is received, the automatic recording/responding function is first carried out. In a step S1, the sending of a response message (speech message) is started.

In a step S2, if the switch 8 which has been preset is in an ON position, steps S5 and S6 are carried out, and if it is in an OFF position, normal steps S3 and S4 are carried out.

In the step S3, a facsimile signal (for example, a CNG signal) from the sending station is detected and the facsimile process is started. The facsimile step is carried out on the condition of the detection of the facsimile signal. If the facsimile signal is not detected and the response message terminates in the step S4, the automatic recording/responding function is immediately carried out.

On the other hand, if the switch 8 is ON in the step S2, the process proceeds to the step S5 to detect the specific DTMF signal (for example, the DTMF signal "2, 5, #") of the pattern stored in the memory 4. When the DTMF signal is detected, the facsimile operation is carried out, and when the DTMF signal is not detected and the response message terminates, the automatic recording/responding function is carried out.

As described above, when the switch 8 is ON, the process on the left hand of FIG. 2 which is a characteristic of the present embodiment is carried out, and the facsimile communication is carried out only when the specific DTMF signal of the pattern stored in the memory 4 is received. When the switch 8 is OFF, the facsimile mode is selected if the facsimile signal is detected and the automatic recording/responding mode is selected when the facsimile signal is not detected before the response message terminates.

Only when the DTMF signal pattern stored in the memory 4 is received is the facsimile mode selected, to receive or send the image.

Accordingly, in receiving the image, the image can be received from only the station that has sent the specific DTMF signal. Thus, the waste of the record sheet by the reception of unwanted image data such as direct mail is prevented, and the facsimile communication in the closed area which allows the transmission and reception between the stations which meet a specific condition is attained.

The specific DTMF signal pattern detected in the step S5 may be a signal pattern stored in the ROM in the DTMF detector 6, or the signal pattern may be modified by the console panel or a predetermined ID code may be added to the signal pattern. In this manner, the check to determine whether the facsimile communication is to be carried out or not can be more severely done.

The facsimile communication selected in this manner may include not only reception but also transmission by polling.

The operation during the sending of the response message has been described above. Where the content of the response message is short, it is necessary to detect the DTMF signal during the response message. In this case, an unwanted message will be recorded in the tape recorder. Accordingly, it is necessary to delete the recorded content after the facsimile operation.

When the switch 8 is OFF, the facsimile mode or the automatic recording/responding mode is selected in accordance with the reception of the facsimile signal. Alternatively, the selection may be made in accordance with the detection of the speech signal from the sending station.

In a second embodiment, two facsimile devices of a facsimile system selectively use one line. When the specific DTMF signal is received, image communication is carried out between the two facsimile devices.

FIG. 3 shows a block diagram of the facsimile system of the second embodiment. The like elements to those shown in FIG. 1 are designated by the like numerals and the explanation thereof is omitted.

Numeral 9 denotes a telephone set and numeral 10 denotes a facsimile device connected to a line N. The facsimile device 10 is a telephone built-in facsimile device.

In a normal operation, the telephone set 9 and the telephone set of the facsimile machine 10 are connected to the line N by an NCU (network control unit) of the communication unit 7, and both telephone sets can respond to a call signal (Ci signal) from the line N. In a stand-by mode, when the DTMF detector 6 detects an on-hook pulse and the specific DTMF signal sent from the facsimile device 10, the facsimile communication is carried out between the facsimile device 10 and the facsimile device 11.

Figure 4:
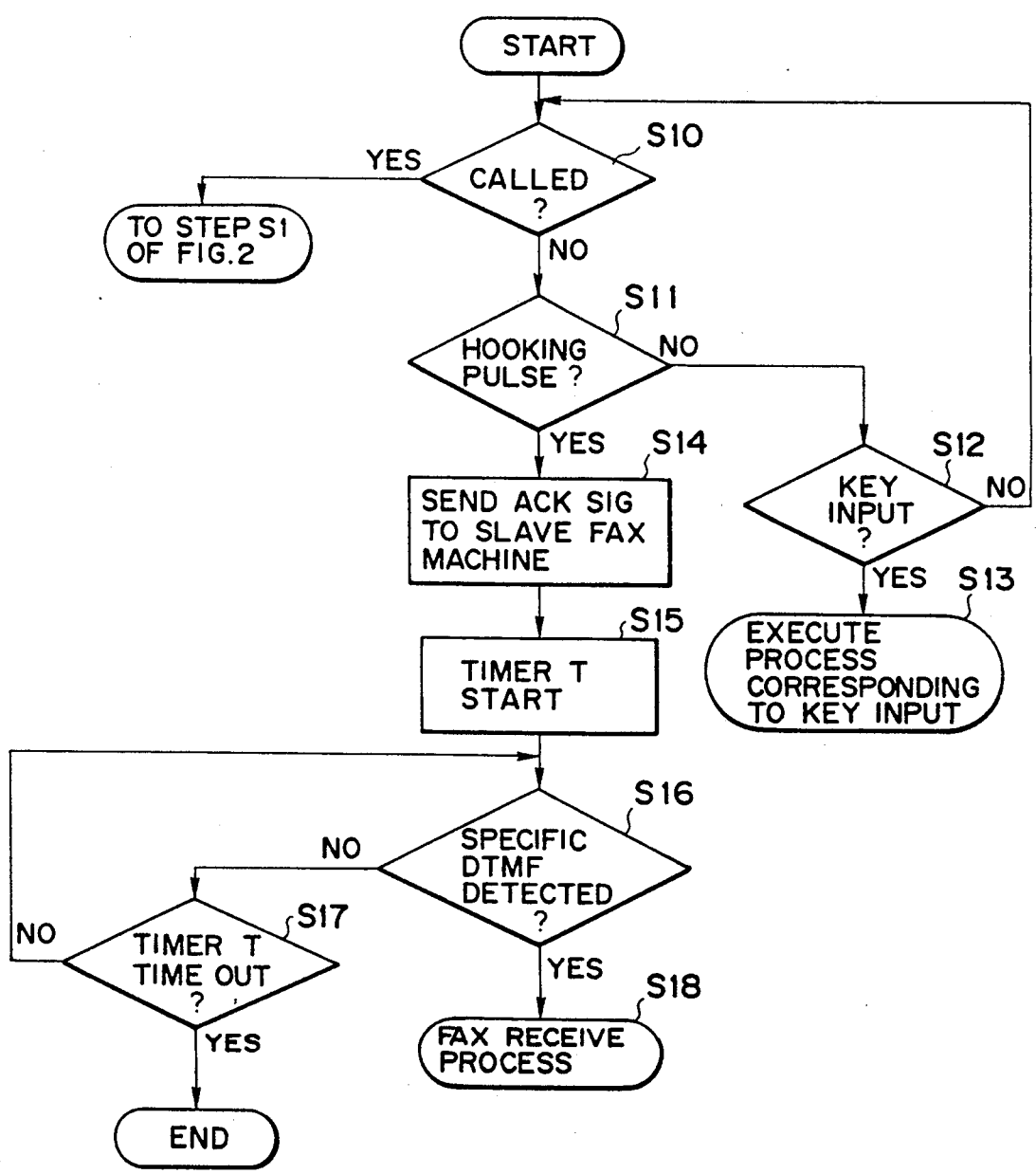
FIG. 4 shows a flow chart of a control operation of a control unit of the second embodiment.

FIG. 4 shows a flow chart of the control operation of the control unit 3 of the second embodiment.

In a step S10, a call signal from the line N is detected, and when the call signal is detected a predetermined number of times (for example, 4 or 5 times), the process proceeds to the step S1 of FIG. 2. If the call is not detected, an on-hook pulse which is generated by the on-hook operation of a hook switch 10-2 arranged under a handset 10-1 is detected in a step S11. If the on-hook pulse is not detected in the step S11, a key entry by a key on the console panel of the facsimile unit 1 is detected in a step 12. If the key entry is not detected, the process returns to the step S10, and if the key entry is detected, a process for the key entry is carried out in a step S13.

On the other hand, if the on-hook pulse from the facsimile device 10 is detected in the step S11, the process proceeds to a step S14 to send a confirmation tone to the slave facsimile device 10. Thus, the acceptance of the on-hook operation is informed to the facsimile device 10. In a step S15, a timer T (for example, a 20-second timer) is started. In steps S16 and S17, whether the specific DTMF signal (for example "2, 5, #" signal) is detected or not before the timer T times out is determined. If the specific DTMF signal is detected, the facsimile receive operation is started in a step S18.

An operator of the slave facsimile 10 hears the confirmation tone by the handset 10-1 after the on-hook operation, and then he/she depresses the dialing ten-key 10-2 to send the DTMF signal to the facsimile device 11. When the facsimile device 11 shifts to the facsimile received mode, the operator can hear a facsimile protocol signal (for example, CED signal). Thus, when he/she hears the facsimile protocol signal, he/she carries out the transmission.

In accordance with the second embodiment, in the system which selectively uses one line for the two facsimile devices, the image communication between the two facsimile devices is attained.

While a facsimile device has been explained in the embodiments, the present invention is also applicable to a telex device.

The present invention is not limited to the above embodiments but various modifications thereof may be made.

What is claimed is:

1. An image communication apparatus, comprising:

line connecting means for selectively connecting a communication line to one of said communication apparatus and a different communication apparatus;

detection means for detecting a DTMF signal; and control means for effecting image communication in accordance with the detection by said detection means;

wherein said control means effects image communication through the communication line in response to receiving a predetermined DTMF signal through the communication line, and effects image communication with the different communication apparatus in response to receiving a predetermined DTMF signal from the different communication apparatus.

2. An apparatus according to claim 1, further comprising another detection means for detecting a predetermined operation of the different communication apparatus, wherein said control means effects image communication with the different communication apparatus in response to receiving the predetermined DTMF signal after said another detecting means detects the predetermined operation of the different communication apparatus.

3. An apparatus according to claim 1, further comprising means for effecting speech communication in response to a call through the communication line, wherein said control means switches from speech communication to image communication in response to receiving a predetermined DTMF signal through the communication line.

4. An image communication apparatus, comprising:

line connecting means for selectively connecting a communication line to one of said communication apparatus and a different communication apparatus;

first detection means for detecting a predetermined operation of the different communication apparatus;

second detection means for detecting a DTMF signal; and control means for effecting image communication with the different communication apparatus in accordance with the detection by said first detection means and the detection by said second detection means.

5. An apparatus according to claim 4, wherein said control means effects image communication with the different communication apparatus in response to said second detection means detecting a predetermined DTMF signal after said first detecting means detects the predetermined operation of the different communication apparatus.

6. An apparatus according to claim 5, wherein said control means effects image communication through the communication line in response to said first detection means not detecting a predetermined operation of the different communication apparatus and said detection means detecting the predetermined DTMF signal.

7. An apparatus according to claim 4, wherein said first detection means detects an on-hook operation of the different communication apparatus.

8. An apparatus according to claim 4, further effecting speech communication in response to a call through the communication line, wherein said control means switches from speech communication to image communication in response to receiving a predetermined DTMF signal through the communication line.

* * * * *